(12) United States Patent
Jackson

(10) Patent No.: US 9,022,044 B1
(45) Date of Patent: May 5, 2015

(54) PORTABLE VEHICLE WASH SYSTEM AND ASSOCIATED METHOD

(76) Inventor: Christopher Jackson, Park Forest, IL (US)

( * ) Notice: Subject to any disclaimer, the term of this patent is extended or adjusted under 35 U.S.C. 154(b) by 687 days.

(21) Appl. No.: 13/298,770

(22) Filed: Nov. 17, 2011

Related U.S. Application Data

(60) Provisional application No. 61/414,639, filed on Nov. 17, 2010.

(51) Int. Cl.
*B08B 3/02* (2006.01)
*B08B 3/04* (2006.01)
*B60S 3/04* (2006.01)

(52) U.S. Cl.
CPC ... *B08B 3/02* (2013.01); *B08B 3/04* (2013.01); *B08B 3/022* (2013.01); *B08B 3/024* (2013.01); *B08B 3/041* (2013.01); *B60S 3/04* (2013.01)

(58) Field of Classification Search
CPC .......... B08B 3/02; B08B 3/022; B08B 3/024; B08B 3/04; B08B 3/041; B60S 3/04
USPC ............ 134/45, 123, 172, 198, 201; 239/695, 239/273, 276, 280.5
See application file for complete search history.

(56) References Cited

U.S. PATENT DOCUMENTS

| | | | |
|---|---|---|---|
| 3,072,131 A | 1/1963 | Di Laurenzio | |
| 4,936,330 A | 6/1990 | LaHue | |
| 5,638,843 A * | 6/1997 | Strickland | 134/123 |
| 2005/0133071 A1 | 6/2005 | Brady | |

* cited by examiner

*Primary Examiner* — Saeed T Chaudhry

(57) ABSTRACT

A portable vehicle wash system for use during pre-wash and post-wash procedures preferably includes a portable and collapsible free-standing frame capable of may be positioned over an existing vehicle. Such a free-standing frame preferably includes first and second support sections. Each of the first and second support section preferably includes a fluid discharge section, and a plurality of legs integrally formed with the fluid discharge section. Notably, the fluid discharge section of the first support section is isolated from the fluid discharge section of the second support section. A hose is also provided in fluid communication with the free-standing frame. In this manner, the hose may be coupled to an existing water supply source such that water is simultaneously channeled through the free-standing frame and simultaneously dispersed out from the fluid discharge section of each of the first and second support sections.

13 Claims, 5 Drawing Sheets

PORTABLE VEHICLE WASH SYSTEM AND ASSOCIATED METHOD

CROSS REFERENCE TO RELATED APPLICATIONS

This application claims the benefit of U.S. Provisional Application No. 61/414,639, filed Nov. 17, 2010, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE DISCLOSURE

1. Technical Field

This disclosure relates to vehicle washing systems and, more particularly, to a portable vehicle wash system for providing an effective and efficient means of thoroughly rinsing a vehicle in pre-wash and post-wash procedures.

2. Prior Art

Apart from our physical appearance, personal grooming, and clothes, we are perhaps most often judged by others on the basis of our possessions. Wise men and women throughout history have remarked that a person's self-respect extends to his or her possessions, pointing out that a self-respecting person is almost certain to have a neat and clean personal appearance, a clean and orderly home, and in our day, a neat and tidy vehicle. A self-respecting person takes vehiclee of things, keeps his or her possessions shipshape, and considers it proper and necessary to have a place for everything and everything in its place. Such a person inevitably treats tools with respect.

Not only are a home and vehicle the most visible, expensive, and probably important of our possessions, but both require substantial upkeep on our part to retain their pleasing appearance and their financial value. Apart from the more costly repairs that are sometimes required, the routine tasks of maintenance are fairly simple, but they must be performed regularly. Among these, cleaning or washing are of paramount importance. With regard to cleaning both automobiles and houses, substantial industries have arisen. For the home, thousands of small businesses have arisen to perform the service of pressure or steam washing and the amount charged is sufficient to support a business owner, employees, and their families.

Vehicle washes range from the coin-operated to the basic drive through, to deluxe detailing treatments and prices range from $1.50 to $75 or more. For most of us, however, financial necessity, or simple self-reliance, dictates that we perform these chores, whenever possible, ourselves. Unfortunately, when it comes to cleaning equipment, our choices are probably limited to a garden hose, a bucket, detergent, sponges, and towels so that when it comes to washing the high-dollar sedans, big SUV's and pickups so popular today, we have difficulty even getting the vehicle properly wet, and later rinsing it off.

Accordingly, a need remains for a portable vehicle wash system in order to overcome the above-noted shortcomings. The present disclosure satisfies such a need by providing a portable vehicle wash system that is convenient and easy to use, lightweight yet durable in design, versatile in its applications, and designed for enabling consumers to wash his or her vehicle more easily, faster, and more conveniently than by hand alone.

BRIEF SUMMARY OF THE DISCLOSURE

In view of the foregoing background, it is therefore an object of the non-limiting exemplary embodiment(s) to provide a portable vehicle wash system for use during pre-wash and post-wash procedures. These and other objects, features, and advantages of the disclosure are provided by a portable vehicle wash system including a portable and collapsible free-standing frame capable of may be positioned over an existing vehicle. Such a free-standing frame preferably includes first and second support sections. Each of the first and second support section preferably includes a fluid discharge section, and a plurality of legs integrally formed with the fluid discharge section. Notably, the fluid discharge section of the first support section is isolated from the fluid discharge section of the second support section.

A hose is also provided in fluid communication with the free-standing frame. In this manner, the hose may be coupled to an existing water supply source such that water is simultaneously channeled through the free-standing frame and simultaneously dispersed out from the fluid discharge section of each of the first and second support sections.

In a non-limiting exemplary embodiment, the legs of each of the first and second support sections may be linearly shaped and in direct fluid communication with the hose, respectively.

In a non-limiting exemplary embodiment, the legs of the first support section may be pivotally coupled to the legs of the second support section such that the frame may be selectively articulated between collapsed and free-standing positions, respectively.

In a non-limiting exemplary embodiment, each of the legs of the first and second support sections may be telescopically adjustably.

In a non-limiting exemplary embodiment, the first and second support sections may be coextensively shaped and remain located above rear and front sections of the existing vehicle during rinsing procedures, respectively.

In a non-limiting exemplary embodiment, the fluid discharge section of each of the first and second support sections preferably includes a plurality of fluid discharge apertures spaced between the legs of the first and second support sections, respectively.

In a non-limiting exemplary embodiment, the hose preferably includes a bifurcated proximal end may have first and second terminals in fluid communication with the legs of the first and second support sections, respectively.

In a non-limiting exemplary embodiment, the first and second terminals may be isolated from the legs of the second and first support sections, respectively.

A non-limiting exemplary embodiment of the present disclosure may further include a method of utilizing a portable vehicle wash system for use during pre-wash and post-wash procedures. Such a method preferably includes the initial step of: providing and positioning a portable and collapsible free-standing frame over an existing vehicle wherein the free-standing frame including first and second support sections each including a fluid discharge section, and a plurality of legs integrally formed with the fluid discharge section. In this manner, fluid discharge section of the first support section may be isolated from the fluid discharge section of the second support section.

Such a method may further include the chronological steps of: providing and fluidly communicating a hose with the free-standing frame; coupling the hose to an existing water supply source; and simultaneously channeling water through the free-standing frame such that water is simultaneously dispersed out from the fluid discharge section of each of the first and second support sections.

In a non-limiting exemplary embodiment, the portable vehicle wash system may feature a cleaning agent dispenser so that users may conveniently discharge the cleaning agent during the rinsing process to further save time and effort on the washing process.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the exemplary embodiment(s) of the disclosure, which is measured by the claims, nor is it intended to be limiting as to the scope of the disclosure in any way.

BRIEF DESCRIPTION OF THE SEVERAL VIEWS OF THE DRAWING

The novel features believed to be characteristic of this disclosure are set forth with particularity in the appended claims. The disclosure itself, however, both as to its organization and method of operation, together with further objects and advantages thereof, may best be understood by reference to the following description taken in connection with the accompanying drawings in which:

Figures 1, 2:
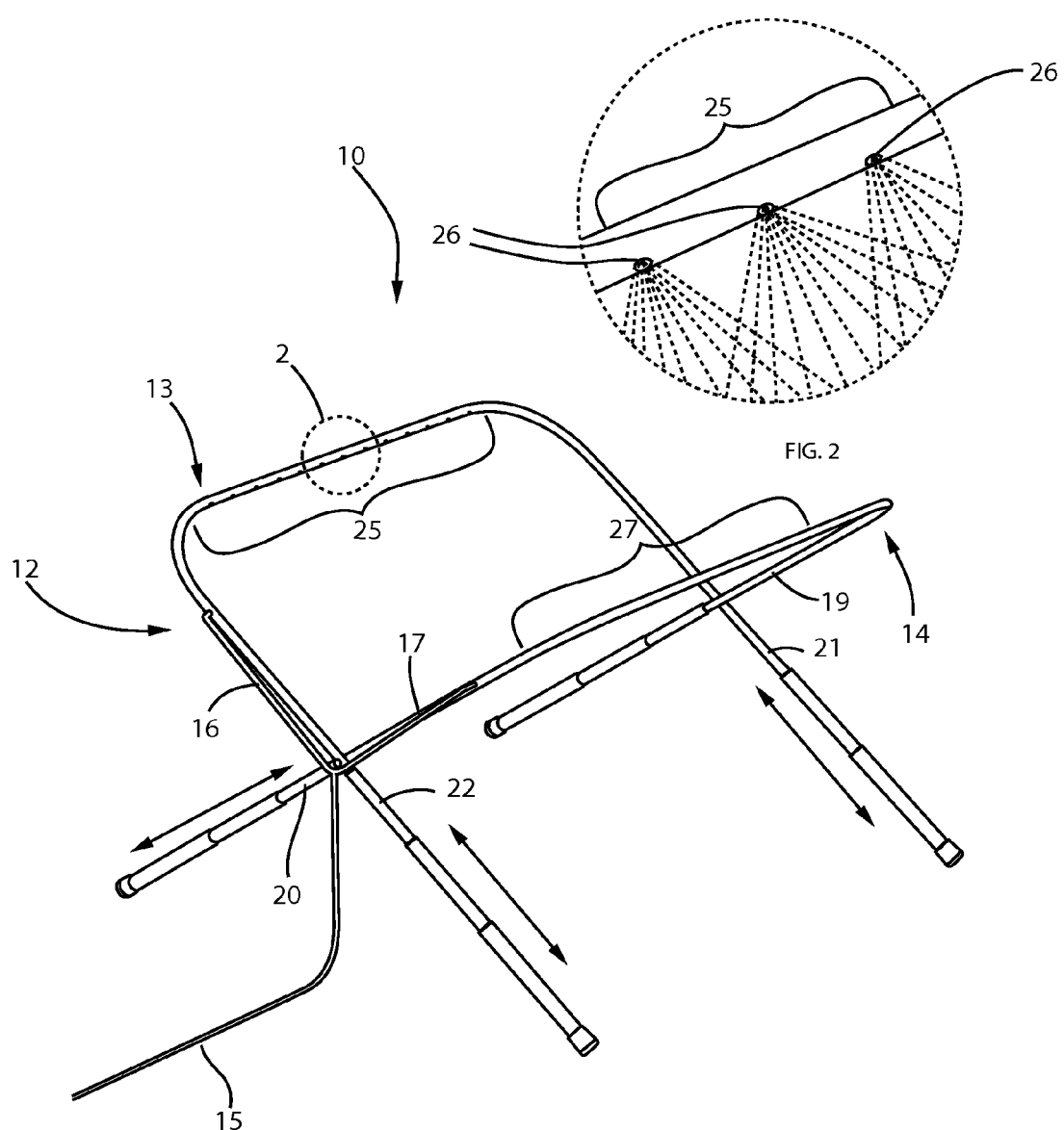
FIG. 1 is a perspective view showing a portable vehicle wash system, in accordance with a non-limiting exemplary embodiment of the present disclosure.
FIG. 2 is an enlarged view showing a fluid discharge section at area 2 in FIG. 1.

Those skilled in the art will appreciate that the figures are not intended to be drawn to any particular scale; nor are the figures intended to illustrate every embodiment of the disclosure. The disclosure is not limited to the exemplary embodiment(s) depicted in the figures.

DETAILED DESCRIPTION OF THE DISCLOSURE

The non-limiting exemplary embodiment(s) will now be described more fully hereinafter with reference to the accompanying drawings, in which a preferred embodiment of the disclosure is shown. This disclosure may, however, be embodied in many different forms and should not be construed as limited to the embodiment set forth herein. Rather, this embodiment is provided so that this application will be thorough and complete, and will fully convey the true scope of the disclosure to those skilled in the art. Like numbers refer to like elements throughout the figures.

The illustrations of the embodiment(s) described herein are intended to provide a general understanding of the structure of the various embodiment(s). The illustrations are not intended to serve as a complete description of all of the elements and features of apparatus and systems that utilize the structures or methods described herein. Many other embodiment(s) may be apparent to those of skill in the art upon reviewing the disclosure. Other embodiment(s) may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the scope of this application to any particular disclosure or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of various embodiment(s). Combinations of the above embodiment(s), and other embodiment(s) not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed embodiment(s). Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiment(s) which fall within the true scope of the non-limiting exemplary embodiment(s). Thus, to the maximum extent allowed by law, the scope of the non-limiting exemplary embodiment(s) is to be determined by the broadest permissible interpretation of the following claims and their equivalents, and shall not be restricted or limited by the foregoing detailed description.

References in the specification to "one embodiment", "an exemplary embodiment", "a preferred embodiment", "an alternative embodiment" and similar phrases mean that a particular feature, structure, or characteristic described in connection with the embodiment is included in at least an embodiment of the disclosure. The appearances of the phrase "a non-limiting exemplary embodiment" in various places in the specification are not necessarily all meant to refer to the same embodiment.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

Figure 3:
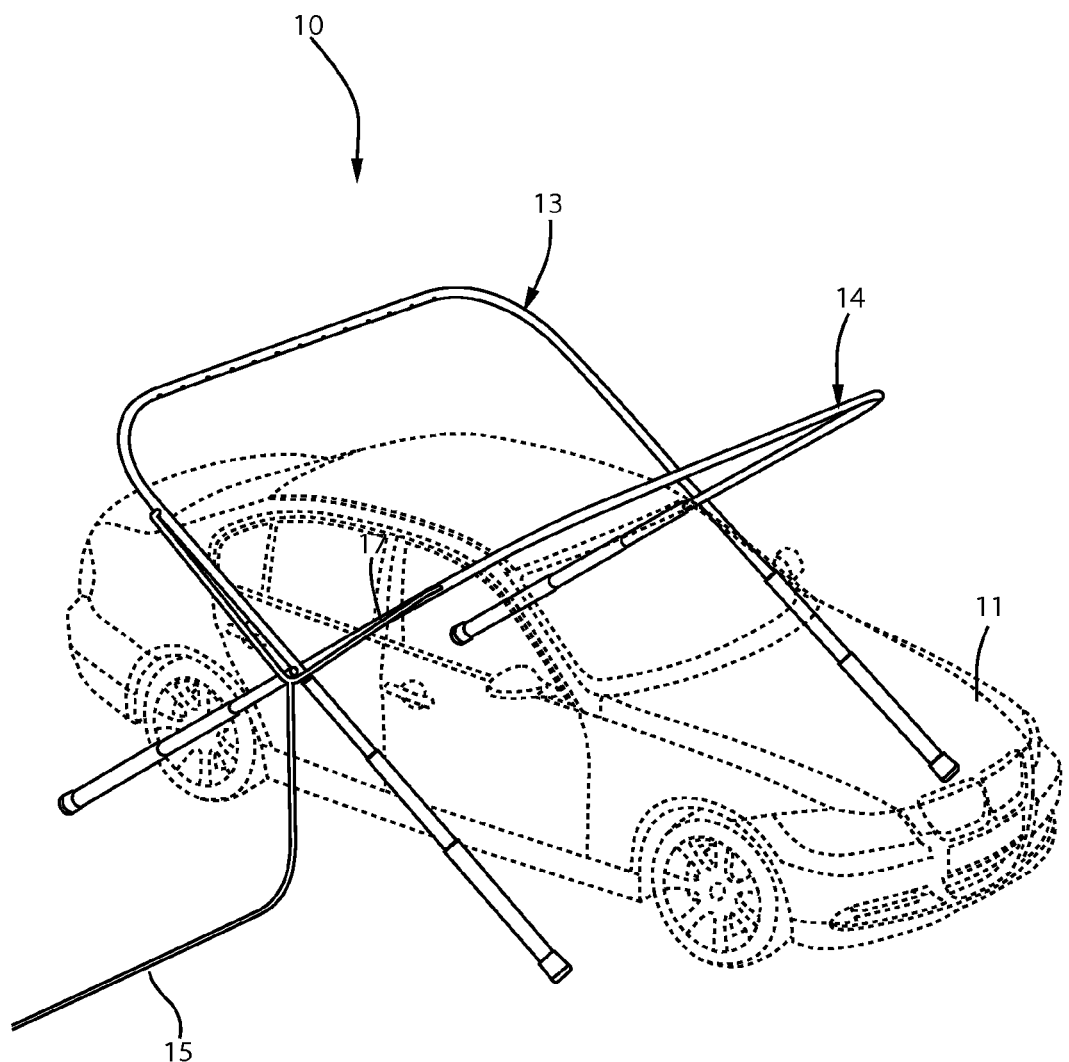
FIG. 3 is a perspective view showing a portable vehicle wash system in a preferred environment wherein the vehicle is positioned subjacent to a free-standing frame of the portable vehicle wash system.
Figure 4:
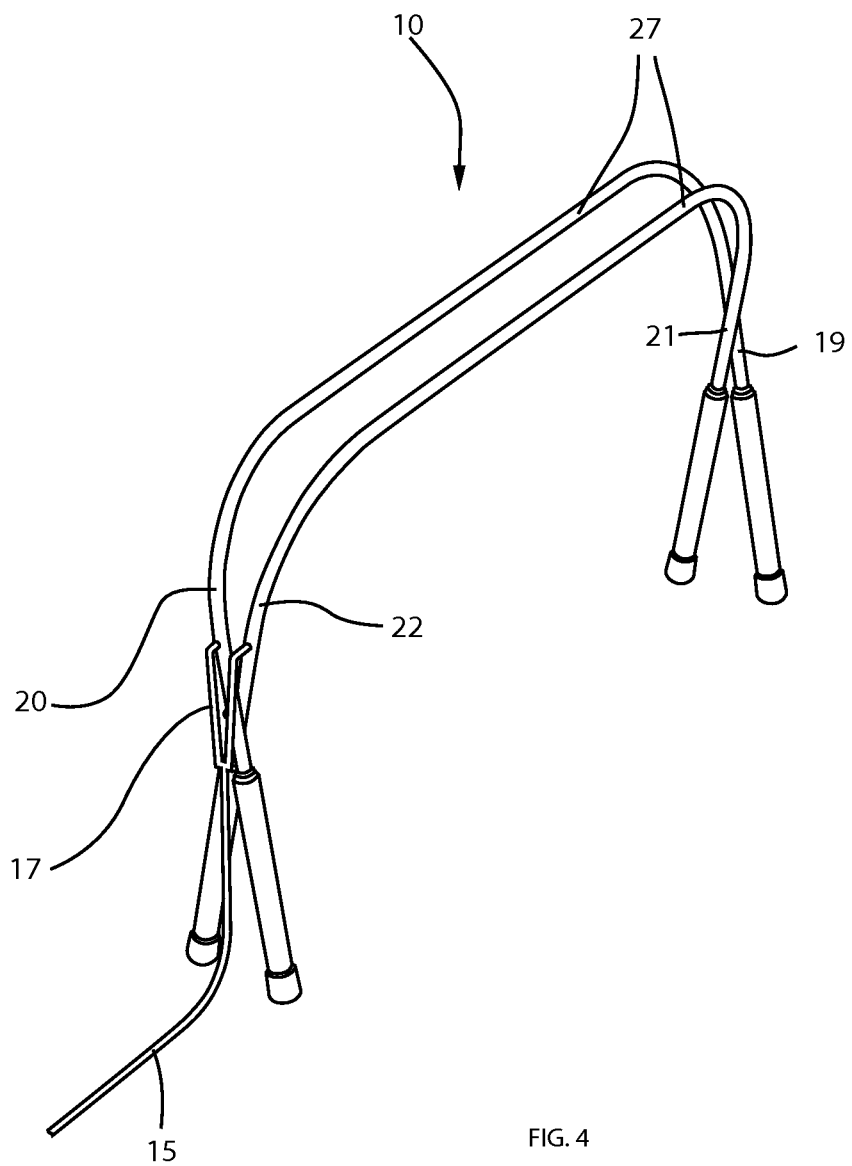
FIG. 4 is a perspective view showing the free-standing frame at a collapsed (folded) position.
Figure 5:
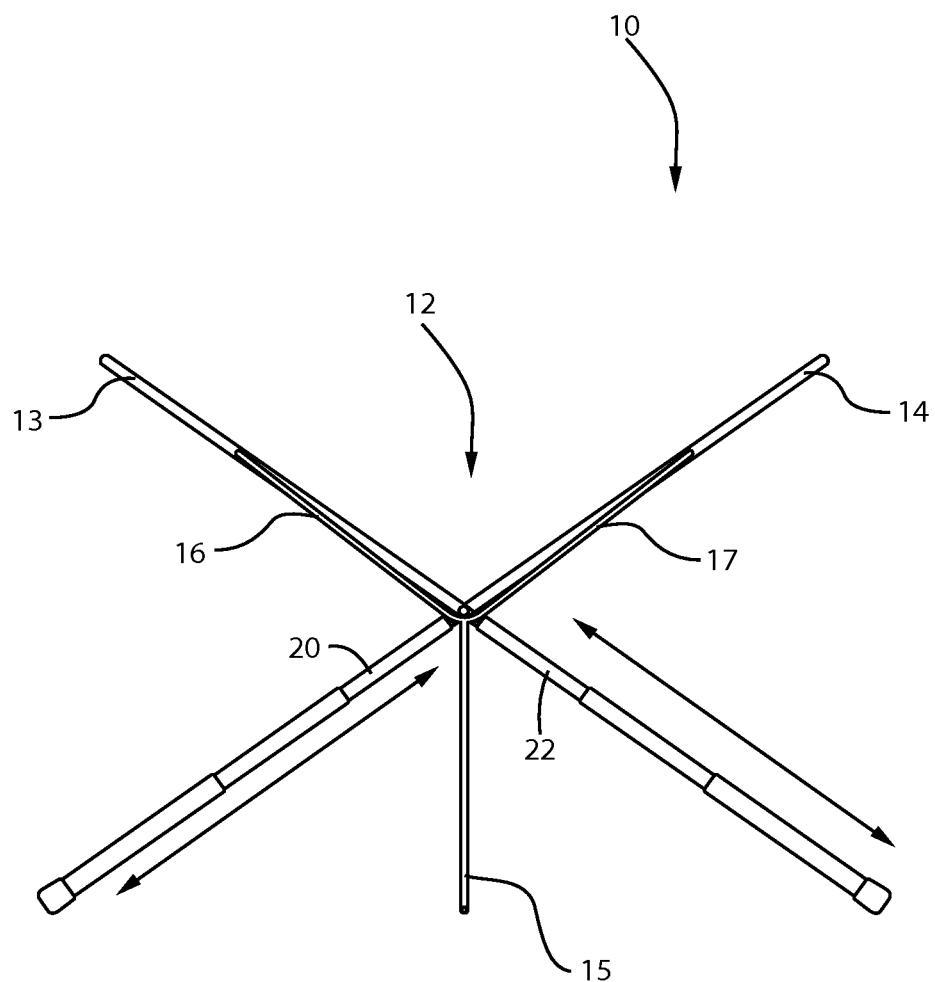
FIG. 5 is a side elevational view of the portable vehicle wash system shown in FIG. 1.
Figure 6:
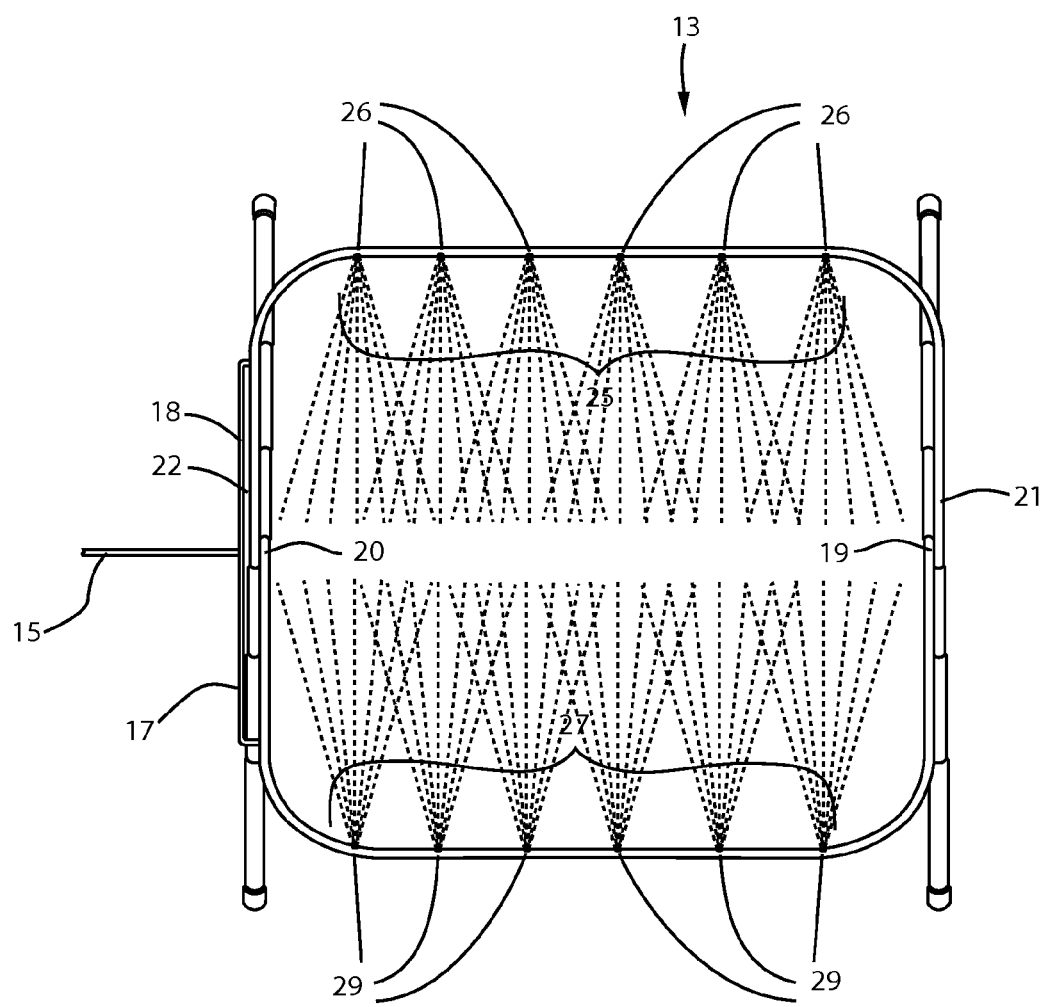
FIG. 6 is a top plan view showing fluid dispersal from each fluid discharge section.

Exemplary embodiment(s) of the disclosure is referred to generally in FIGS. 1-6 and is intended to provide a portable vehicle wash system 10 and associated method therefore. It should be understood that the exemplary embodiment(s) may be used to assist in washing of many types of vehicles 11, and should not be limited to the uses described herein.

Referring to FIGS. 1-6, a portable vehicle wash system 10 for use during pre-wash and post-wash procedures is illustrated as preferably include a portable and collapsible free-standing frame 12 capable of being positioned over an existing vehicle 11. Such a free-standing frame 12 preferably includes first and second support sections 13, 14. Each of the first and second support sections 13, 14 preferably includes a fluid discharge section 25, 27, and a plurality of legs 19, 20 and 21, 22 integrally formed with the fluid discharge sections 25, 27. Notably, the fluid discharge section 25 of the first support section 13 is isolated from the fluid discharge section 27 of the second support section 14. Such a structural configuration provides the unexpected and unpredictable advantage of permitting a user to selectively and independently rinse only a desired portion of the vehicle 11; such as the front or rear portion of the vehicle.

A hose 15 is also provided in fluid communication with the free-standing frame 12. In this manner, the hose 15 may be coupled to an existing water supply source such that water is simultaneously channeled through the free-standing frame 12 and simultaneously dispersed out from the fluid discharge section 25, 27 of each of the first and second support sections 13, 14. Such a structural configuration provides the unexpected and unpredictable advantage of ensuring both the front and rear sections of the vehicle 11 are rinsed at the same time, if desired by the user. This overcomes the shortcoming of premature drying of water droplets on either the front or rear of the vehicle 11 during sunny days.

In a non-limiting exemplary embodiment, the legs 19, 20 and 21, 22 of each of the first and second support sections 13, 14 may be linearly shaped and in direct fluid communication with the hose 15, respectively. Such a structural configuration provides the unexpected and unpredictable advantage of quickly and efficiently channeling the water to the fluid discharge sections 13, 14, without having to travel along an undesirably long path prior to being dispersed on the vehicle 11.

In a non-limiting exemplary embodiment, the legs 21, 22 of the first support section 13 may be pivotally coupled to the legs 19, 20 of the second support section 14 such that frame 12 may be selectively articulated between collapsed and free-standing positions, respectively. Such a structural configuration provides the unexpected and unpredictable advantage of easily folding and erecting the free-standing frame 12 as well as adjusting a height thereof for different vehicles 11.

In a non-limiting exemplary embodiment, each of the legs 21, 22 and 19, 20 of the first and second support sections 13, 14 may be telescopically adjustably. Such a structural configuration provides the unexpected and unpredictable advantage of compact storage during non-use and height adjustably during use of free-standing frame 12.

In a non-limiting exemplary embodiment, the first and second support sections 13, 14 may be coextensively shaped and remain located above rear and front sections of the existing vehicle 11 during rinsing procedures, respectively. Such a structural configuration provides the unexpected and unpredictable advantage of ensuring a weight of the free-standing frame 12 is equally balanced during use.

In a non-limiting exemplary embodiment, the fluid discharge section 25, 27 of each of the first and second support sections 13, 14 preferably includes a plurality of fluid discharge apertures 26, 29 spaced between the legs 21, 22 and 19, 20 of the first and second support sections 13, 14, respectively. Such a structural configuration provides the unexpected and unpredictable advantage of ensuring water is discharged from a topmost height of the free-standing frame 12 after the water reaches each fluid discharge section 25, 27.

In a non-limiting exemplary embodiment, the hose 15 preferably includes a bifurcated proximal end may have first and second terminals 16, 17 in fluid communication with the legs 21, 22 and 19, 20 of the first and second support sections 13, 14, respectively. Such a structural configuration provides the unexpected and unpredictable advantage of ensuring an equal quantity of water reaches each fluid discharge section 25, 27, as needed during use.

In a non-limiting exemplary embodiment, the first and second terminals 16, 17 may be isolated from the legs 21, 22 and 19, 20 of the second and first support sections 14, 13, respectively. Such a structural configuration provides the unexpected and unpredictable advantage of preventing cross-flow of fluid as the fluid travels within each support section 13, 14 prior to reaching its final destination at fluid discharge sections 25, 27, respectively.

A non-limiting exemplary embodiment of the present disclosure may further include a method of utilizing a portable vehicle wash system 10 for use during pre-wash and post-wash procedures. Such a method preferably includes the initial step of: providing and positioning a portable and collapsible free-standing frame 12 over an existing vehicle 11 wherein the free-standing frame 12 includes first and second support sections 13, 14 each including a fluid discharge section 25, 27, and a plurality of legs 19, 20 and 21, 22 integrally formed with the fluid discharge sections 25, 27. In this manner, fluid discharge section 25 of the first support section 13 may be isolated from the fluid discharge section 27 of the second support section 14.

Such a method may further include the chronological steps of: providing and fluidly communicating a hose 15 with the free-standing frame 12; coupling the hose 15 to an existing water supply source; and simultaneously channeling water through the free-standing frame 12 such that water is simultaneously dispersed out from the fluid discharge sections 25, 27 of each of the first and second support sections 13, 14.

In a non-limiting exemplary embodiment, the portable vehicle wash system 10 may feature a cleaning agent dispenser so that users may conveniently discharge the cleaning agent during a washing process to further save time and effort.

Exemplary embodiment(s) of the disclosed portable vehicle wash system 10 may be constructed of durable, sturdy and lightweight aluminum tubing or other suitable materials known to one skilled in the art. The first and second support sections 13, 14 may be U-shaped. In this manner, the legs 19, 20 and 21, 22 may support the free-standing frame 12 and remain positioned on either side of the vehicle 11. Of course, legs 19, 20 and 21, 22 are preferably hollow, and each may include an optional hose-bib (not shown) and/or a close-valve (not shown), such that water can be selectively channeled to the fluid discharge sections 25, 27.

In a non-limiting exemplary embodiment, the fluid discharge sections 25, 27 may be bowed and/or joined to an optional canopy (not shown). The optional canopy may be made from a fibrous material and further latticed with water-conducting tunnels. The underside of the canopy tunnels may be perforated with a plurality of orifices (not shown) that, when pressurized, spray water onto the upper surface of the vehicle 11.

In a non-limiting exemplary embodiment, use of the portable vehicle 11 wash system 10 would be simple and straightforward. As an example, the user may articulate the free-standing frame 12 from a folded (collapsed) position to an open position wherein the free-standing frame 12 is erected over the vehicle 11. The optional canopy (not shown) may be attached, if desired. With the legs 19, 20 and 21, 22 of the frame 12 properly positioned, the optional canopy (not shown) can be stretched over the roof, hood, and trunk of the vehicle 11. Next, hose 15 may be attached to the water supply source as well as to desired legs 19, 20 and 21, 22 of each of the first and second support sections 13, 14. By turning on the water, water is discharged from the fluid discharge sections 25, 27 and thereby rinses the vehicle 11 during a pre-wash phase. As an option, when the pre-wash rinse is completed, the user may turn off the water and soap wash the rinsed vehicle 11. For the post-wash rinsing phase, the user simply turns on the water again, and water is automatically discharged on the vehicle 11. At the conclusion of the washing process, the user may either collapse the free-standing frame 12 for storage or drive a new vehicle 11 underneath the free-standing frame 12.

While the disclosure has been described with respect to a certain specific embodiment, it will be appreciated that many modifications and changes may be made by those skilled in the art without departing from the spirit of the disclosure. It is intended, therefore, by the appended claims to cover all such modifications and changes as fall within the true spirit and scope of the disclosure. In particular, with respect to the above description, it is to be realized that the optimum dimensional relationships for the parts of the non-limiting exemplary embodiment(s) may include variations in size, materials, shape, form, function and manner of operation.

What is claimed as new and what is desired to secure by Letters Patent of the United States is:

1. A portable vehicle wash system for use during pre-wash and post-wash procedures, said portable vehicle wash system comprising:
    a free-standing frame capable of being positioned over an existing vehicle, said free-standing frame comprising first and second support sections each including
    a fluid discharge section, and
    a plurality of legs in communication with said fluid discharge section, said legs of said first support section are pivotally coupled to said legs of said second support section such that said frame is selectively articulated between collapsed and free-standing position respectively; and
    a hose in fluid communication with said free-standing frame;
    wherein said hose is adapted to be coupled to an existing water supply source such that water is channeled through said free-standing frame and dispersed out from said fluid discharge section of each of said first and second support sections;
    wherein said hose comprises a bifurcated proximal end having first and second terminals in fluid communication with said legs of said first and second support sections respectively.

2. The portable vehicle wash system of claim 1, wherein said legs of each of said first and second support sections are in direct fluid communication with said hose respectively.

3. The portable vehicle wash system of claim 1, wherein each of said legs of said first and second support sections are telescopically adjustably.

4. The portable vehicle wash system of claim 1, wherein said first and second support sections are curvilinear and capable of remaining located above rear and front sections of the existing vehicle during rinsing procedures, respectively.

5. The portable vehicle wash system of claim 1, wherein said fluid discharge section of each of said first and second support sections comprises: a plurality of fluid discharge apertures spaced between said legs of said first and second support sections respectively.

6. The portable vehicle wash system of claim 1, wherein said first and second terminals are isolated from said legs of said second and first support sections respectively.

7. A portable vehicle wash system for use during pre-wash and post-wash procedures, said portable vehicle wash system comprising:
    a portable and collapsible free-standing frame capable of being positioned over an existing vehicle, said free-standing frame comprising first and second support sections each including
    a fluid discharge section, and
    a plurality of legs in communication with said fluid discharge section said legs of said first support section are pivotally coupled to said legs of said second support section such that said frame is selectively articulated between collapsed and free-standing position respectively; and
    a hose in fluid communication with said free-standing frame;
    wherein said hose is adapted to be coupled to an existing water supply source such that water is simultaneously channeled through said free-standing frame and simultaneously dispersed out from said fluid discharge section of each of said first and second support sections;
    wherein said fluid discharge section of said first support section is isolated from said fluid discharge section of said second support section;
    wherein said hose comprises a bifurcated proximal end having first and second terminals in fluid communication with said legs of said first and second support sections respectively.

8. The portable vehicle wash system of claim 7, wherein said legs of each of said first and second support sections are in direct fluid communication with said hose respectively.

9. The portable vehicle wash system of claim 7, wherein each of said legs of said first and second support sections are telescopically adjustably.

10. The portable vehicle wash system of claim 7, wherein said first and second support sections are curvilinear and capable of remaining located above rear and front sections of the existing vehicle during rinsing procedures, respectively.

11. The portable vehicle wash system of claim 7, wherein said fluid discharge section of each of said first and second support sections comprises: a plurality of fluid discharge apertures spaced between said legs of said first and second support sections respectively.

12. The portable vehicle wash system of claim 7, wherein said first and second terminals are isolated from said legs of said second and first support sections respectively.

13. A method of utilizing a portable vehicle wash system for use during pre-wash and post-wash procedures, said method comprising the chronological steps of:
- providing and positioning a portable and collapsible free-standing frame over an existing vehicle, said free-standing frame comprising first and second support sections each including a fluid discharge section, and a plurality of legs in communication with said fluid discharge section, said fluid discharge section said legs of said first support section are pivotally coupled to said legs of said second support section such that said frame is selectively articulated between collapsed and free-standing position respectively of said first support section is isolated from said fluid discharge section of said second support section;
- providing and fluidly communicating a hose with said free-standing frame;
- coupling said hose to an existing water supply source; and
- simultaneously channeling water through said free-standing frame such that water is simultaneously dispersed out from said fluid discharge section of each of said first and second support sections;
- wherein said hose comprises a bifurcated proximal end having first and second terminals in fluid communication with said legs of said first and second support sections respectively.

* * * * *